(12) United States Patent
Hardin

(10) Patent No.: US 11,105,415 B2
(45) Date of Patent: Aug. 31, 2021

(54) METHODS AND SYSTEMS FOR IMPROVING THE OPERATION OF TRANSMISSIONS FOR MOTOR VEHICLES

(71) Applicant: David A Hardin, El Monte, CA (US)

(72) Inventor: David A Hardin, El Monte, CA (US)

(73) Assignee: Transgo, LLC, El Monte, CA (US)

(*) Notice: Subject to any disclaimer, the term of this patent is extended or adjusted under 35 U.S.C. 154(b) by 217 days.

(21) Appl. No.: 16/429,211

(22) Filed: Jun. 3, 2019

(65) Prior Publication Data

US 2020/0011412 A1    Jan. 9, 2020

Related U.S. Application Data

(60) Provisional application No. 62/693,519, filed on Jul. 3, 2018, provisional application No. 62/791,933, filed on Jan. 14, 2019.

(51) Int. Cl.
*F16H 61/00* (2006.01)
*G05D 16/20* (2006.01)

(52) U.S. Cl.
CPC ..... *F16H 61/0009* (2013.01); *F16H 61/0021* (2013.01); *G05D 16/2013* (2013.01); *F16H 2061/0062* (2013.01)

(58) Field of Classification Search
CPC ............ F16H 61/0009; F16H 61/0021; F16H 2061/0062; G05D 16/2013
See application file for complete search history.

(56) References Cited

U.S. PATENT DOCUMENTS

| 4,406,400 | A | * | 9/1983 | Berkhof | .................. F23N 5/067 236/80 F |
| 4,449,426 | A |   | 5/1984 | Younger |  |
| 4,711,140 | A |   | 12/1987 | Younger |  |
| 4,790,938 | A |   | 12/1988 | Younger |  |
| 5,253,549 | A |   | 10/1993 | Younger |  |
| 5,458,545 | A | * | 10/1995 | Adam | ................. F16H 61/0021 475/120 |
| 5,540,628 | A |   | 7/1996 | Younger |  |
| 5,624,342 | A |   | 4/1997 | Younger |  |
| 5,730,685 | A |   | 3/1998 | Younger |  |
| 5,743,823 | A |   | 4/1998 | Younger |  |
| 5,768,953 | A |   | 6/1998 | Younger |  |
| 5,820,507 | A |   | 10/1998 | Younger |  |

(Continued)

OTHER PUBLICATIONS

Automatic Transmission-45RFE/545RFE, Chrysler Corporation, pp. 21-350 through 21-463, (2004).

*Primary Examiner* — Justin Holmes
(74) *Attorney, Agent, or Firm* — Mark P. Stone

(57) ABSTRACT

The "factory installed" hydraulic circuitry of an automotive transmission is modified to increase line pressure to permit heavy duty and high performance applications of the transmission, and to prevent the onboard computer from sensing and counteracting the increased line pressure. The "factory installed" Torque Converter Clutch (TCC) regulator valve is modified to prevent over pressuring of this valve which would otherwise result from the increased line pressure. The "factory installed" Torque Converter Clutch control valve is modified to compensate for the increase in line pressure to adjust the application of the valve to prevent rough or abrupt gear shifts and provide smooth application of the torque converter clutch.

20 Claims, 10 Drawing Sheets

(56) References Cited

U.S. PATENT DOCUMENTS

| | | | |
|---|---|---|---|
| 5,967,928 | A | 10/1999 | Younger |
| 6,099,429 | A | 8/2000 | Younger |
| 6,117,047 | A | 9/2000 | Younger |
| 6,287,231 | B1 | 9/2001 | Younger |
| 6,390,944 | B1 | 5/2002 | Younger |
| 6,565,472 | B1 | 5/2003 | Younger |
| 6,699,157 | B2 | 3/2004 | Younger |
| 6,729,989 | B2 | 5/2004 | Younger |
| 6,814,680 | B2 | 11/2004 | Younger |
| 6,871,397 | B2 | 3/2005 | Younger |
| 6,913,554 | B2 | 7/2005 | Younger |
| 6,964,628 | B2 | 11/2005 | Younger |
| 7,128,679 | B2 | 10/2006 | Younger |
| 7,331,893 | B2 | 2/2008 | Younger |
| 9,429,228 | B2 | 8/2016 | Younger |
| 9,970,534 | B2 | 5/2018 | Younger |
| 2005/0272549 | A1* | 12/2005 | Carne ............... F16H 61/065 475/116 |

* cited by examiner

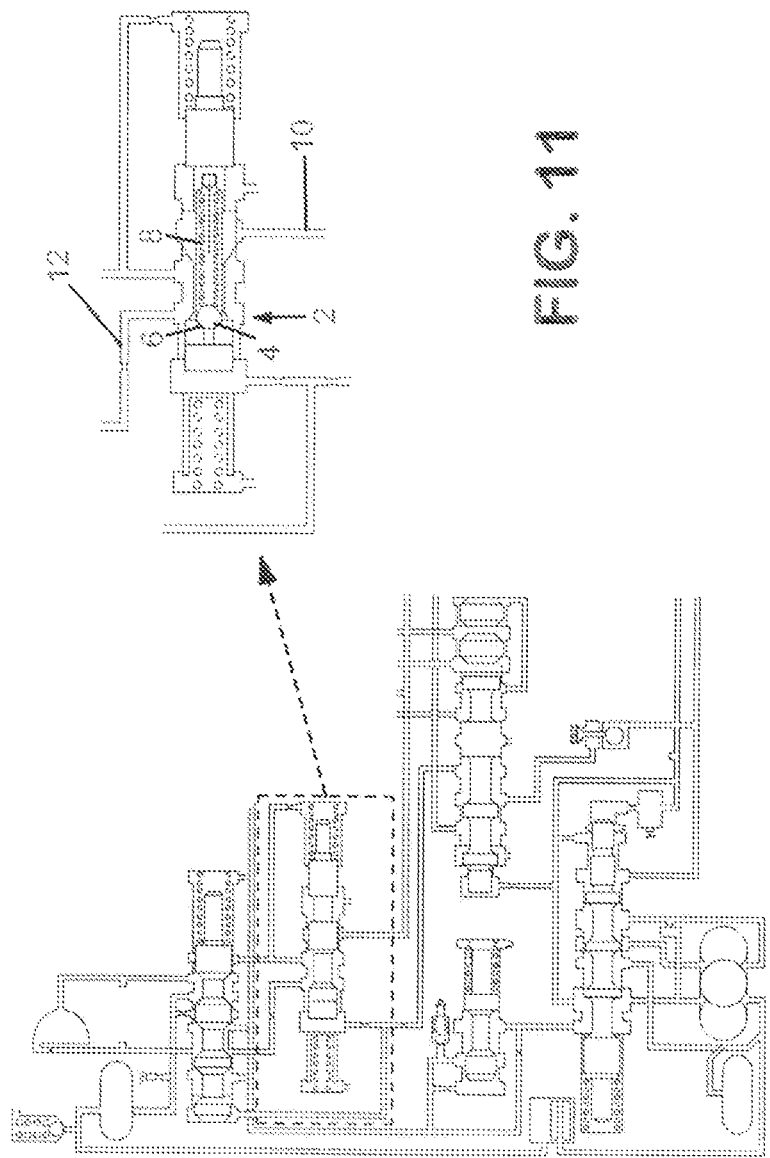

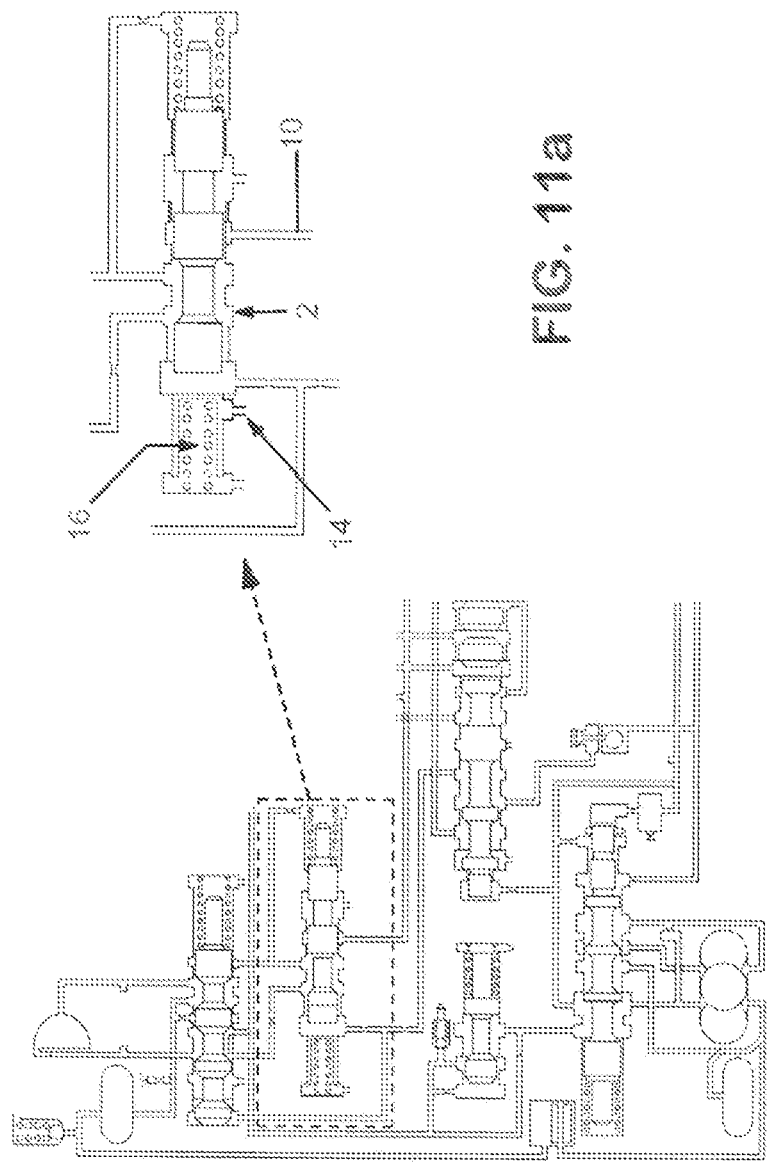

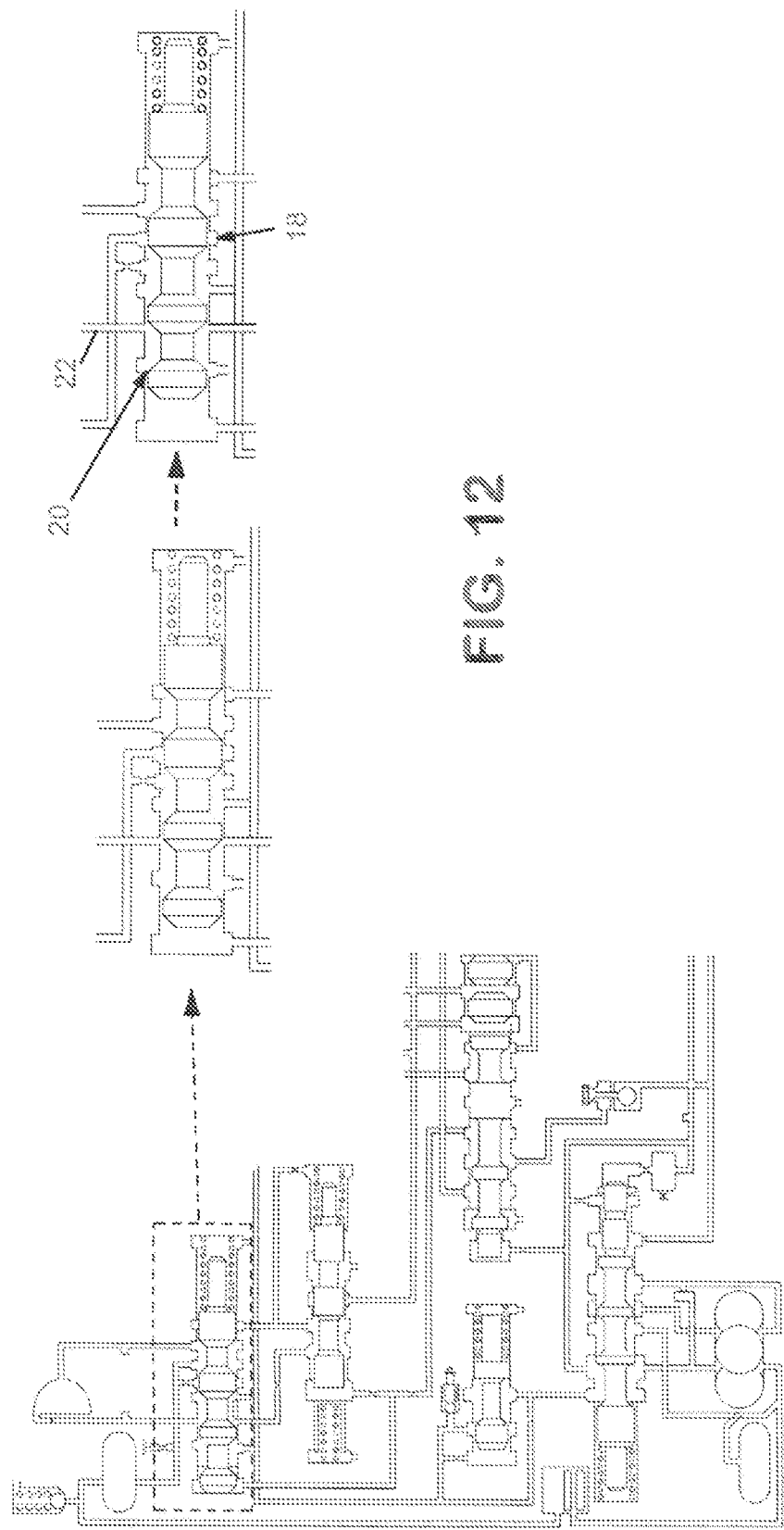

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles, more commonly referred to as "factory installed" transmissions, installed in automotive vehicles by an original motor vehicle manufacturer. The invention is more particularly directed to improvements to the "factory installed" hydraulic circuitry of automotive transmissions designated as 45/545/65/66RFE and 68RFE, installed in vehicles manufactured by Chrysler Corporation of Auburn, Michigan under the trademarks DODGE, RAM and JEEP.

Operation of the aforementioned "factory installed" automotive transmissions are well known to and within the knowledge of persons skilled in the relevant art of automotive transmission operation and design. Descriptions and illustrations of these "factory installed" automotive transmissions are found in a publication of the Chrysler Corporation of Auburn, Mich. identified as AUTOMATIC TRANSMISSION-45RFE/545RFE, pages 21-350 through 21-463, published in 2004, describing and illustrating the aforementioned "factory installed" automotive transmissions is being filed concurrently herewith.

SUMMARY OF THE INVENTION

The "factory installed" hydraulic circuitry of the 45/545/65/66RFE and 68RFE automotive transmissions are modified to increase line pressure, as for example, replacing the "factory installed" pressure regulator valve spring with a stronger spring for increasing permissible line pressure. The increase in line pressure will be sensed by the onboard vehicle computer which is programmed to downwardly adjust an increase in line pressure to a predetermined lower value. The hydraulic circuit of the transmission is further modified so that the increase in the line pressure of the hydraulic fluid is not sensed by the onboard computer to prevent the computer from taking action to lower the line pressure. By maintaining the line pressure at an increased value above normal line pressure of the "factory installed" transmission, the modified automotive transmission is capable of heavy duty and high performance applications requiring line pressure greater than that of the maximum line pressure of the "factory installed" transmission.

The invention further provides modifications to the "factory installed" Torque Converter Clutch (TCC) regulator valve, including replacing the spring of this valve, providing a vent, and providing a ball seated in a valve seat, to prevent over pressuring of this valve which would otherwise result from the increased line pressure.

The invention also provides modifications to the Torque Converter Clutch control valve, including replacing the "factory installed" control valve with a valve having a spool larger in diameter than that of the "factory installed" valve, to compensate for the increase in line pressure to adjust the application of the valve to prevent rough or abrupt gear shifts and provide smooth application of the torque converter clutch.

Accordingly, it is the primary object of the present invention to provide modifications to the hydraulic circuitry of the aforementioned "factory installed" automotive transmissions to increase the line pressure above the maximum permissible line pressure while avoiding responsive line pressure decreases by the onboard computer to enable heavy duty and high performance applications by the modified transmission at higher maximum line pressure; modify the "factory installed" Torque Converter Clutch regulator valve to prevent this valve from becoming over pressured by the increase in line pressure; and modify the "factory installed" Torque Converter Clutch control valve to prevent rough or abrupt application of the Torque Converter Clutch which might otherwise occur as a result of the increased line pressure.

BRIEF DESCRIPTION OF THE DRAWINGS

FIGS. 11 and 11(a) illustrate a portion of the hydraulic circuitry of a 45RFE automotive transmission showing modifications to the Torque Converter Clutch regulator valve in accordance with the present invention; and FIG. 12 illustrates a portion of the hydraulic circuitry of a 45RFE automotive transmission showing modifications to the Torque Converter Clutch control valve in accordance with the present invention.

BEST MODES FOR CARRYING OUT THE INVENTION

Figure 1:
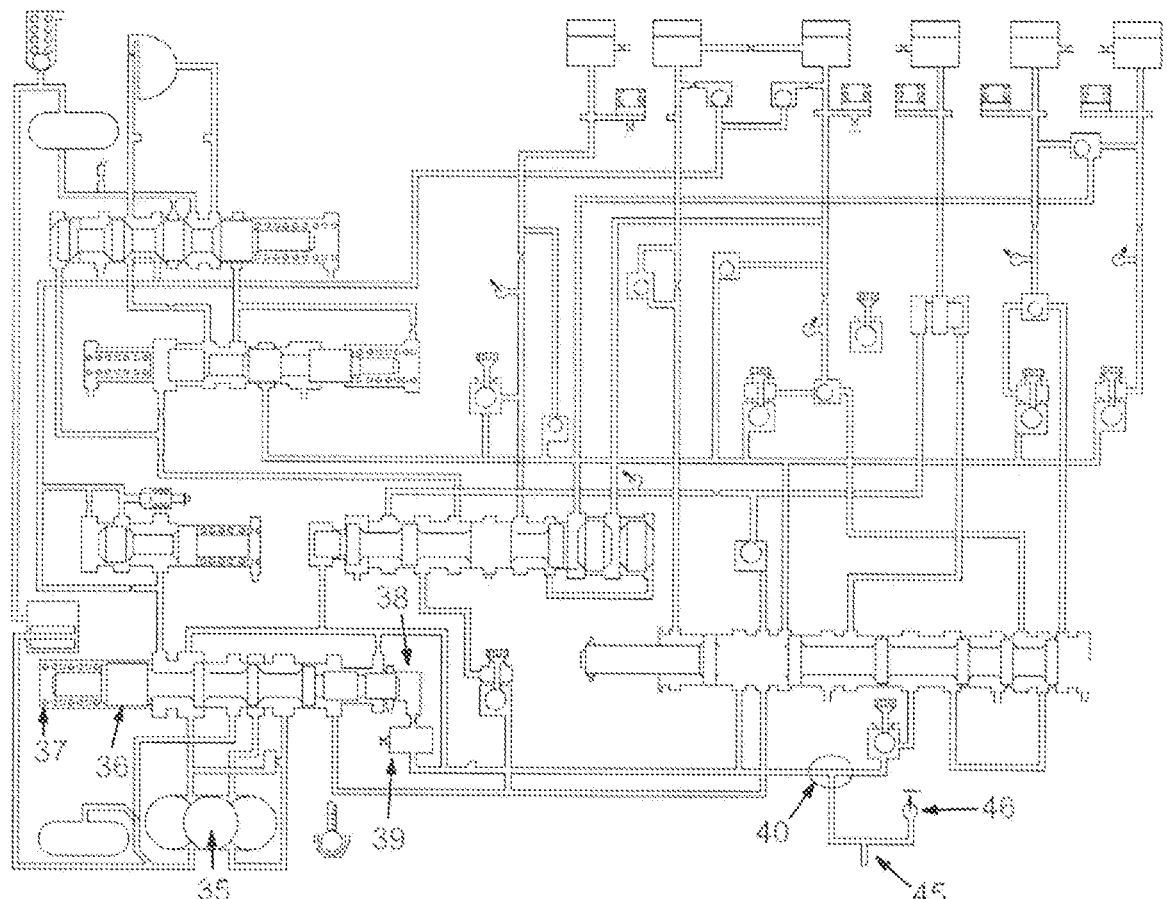
FIG. 1 illustrates the hydraulic circuit of a "factory installed" 45RFE automotive transmission installed in vehicles manufactured by Chrysler Corporation of Auburn, Mich.
Figure 2:
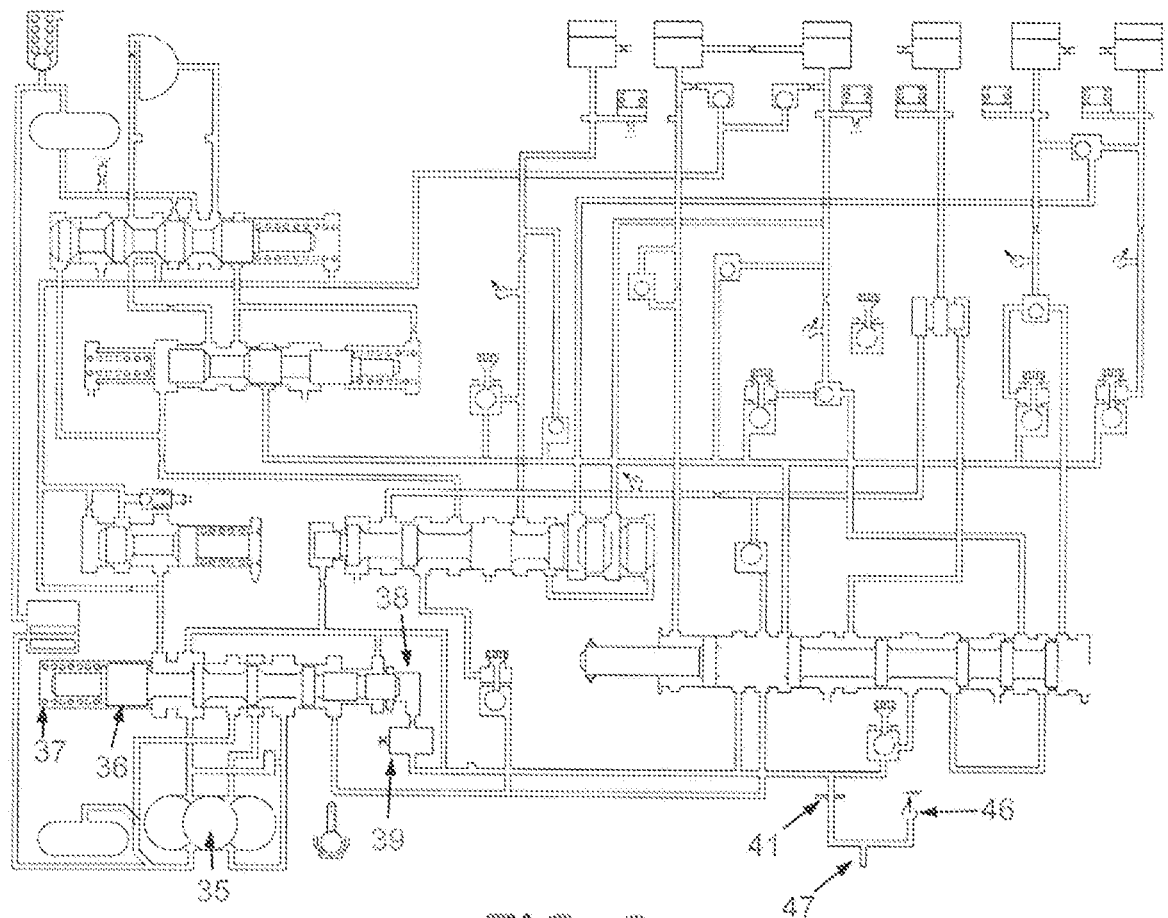
FIG. 2 illustrates a modification to the hydraulic circuit illustrated by FIG. 1 in accordance with the present invention.

Referring to FIG. 1-2 of the drawing, the line pressure or pump output 35 of the hydraulic circuit of the "factory installed" 45RFE automotive transmission is regulated by the pressure regulator valve 36 and the regulator spring 37. This spring has a fixed value to hold the pressure regulator valve in a closed position until sufficient line pressure is delivered from the pump 35 to the right end of the pressure regulator valve, designated by reference numeral 38, to overcome the force of the spring 37 to open the pressure regulator valve to reduce line pressure. The "factory installed" spring 37 is selected to have a spring tension applied to the pressure regulator valve such that the maximum line pressure that can be achieved is 170 PSI (pounds per square inch) in any forward range or gear. The hydraulic circuitry includes a variable force solenoid (VFS) designated by the reference numeral 39, and a variable pressure sensor (VPS) designated by the reference numeral 46. The VFS 39 and the VPS 46 are used in conjunction with a factory installed onboard computer to control the transmission line pressure from approximately 45 PSI up to the maximum line pressure of 170 PSI. Pump pressure output is dependent on several factors including vehicle speed, throttle opening, engine size, and power level.

The factory installed onboard computer regulates current (amperage) to the VFS 39 (Variable Force Solenoid) which will alter the pressure applied to the right side of the pressure regulator valve 36 to create an increase or decrease in the line pressure to match the driving conditions for optimum transmission durability. The factory installed computer monitors the line pressure data through the VPS 46 (Variable Pressure Sensor) through a feedback loop. The onboard computer uses the pressure sensor data to monitor the transmission line pressure several times per second and will make adjustments to the VFS solenoid current to insure the transmission line pressure corresponds to current driving conditions which are programmed into the computer. The feedback loop and the onboard computer will counteract and lower any line pressure exceeding the predetermined maximum value, which might result from the installation of a stronger regulator spring to replace the factory installed regulator spring 37. Accordingly, the "factory installed" transmission will oppose any attempt to increase the maximum line pressure of the hydraulic circuit.

It is the primary goal of the present invention to override the feedback loop and onboard computer to permit maximum line pressure to exceed the limit imposed by the factory installed transmission to enable the modified transmission to accomplish high performance and heavy duty applications while preventing the feedback loop (VPS 46) and onboard computer from monitoring and sensing the increased maximum line pressure, thereby overriding any corrective action by the onboard computer to lower the increased line pressure.

Figure 3:
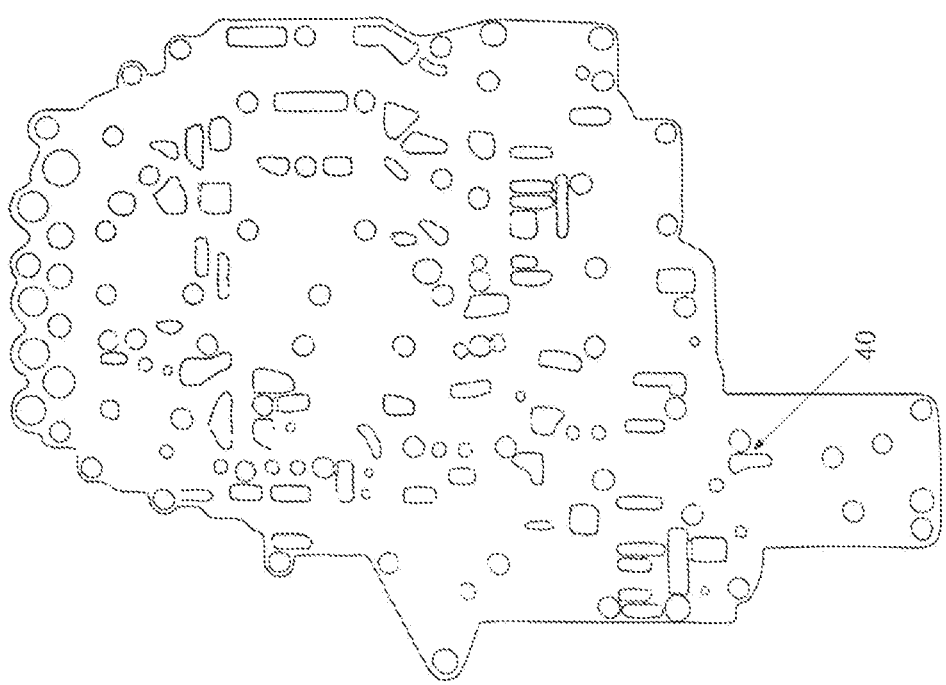
FIG. 3 illustrates a "factory installed" separator plate for the 45RFE automotive transmission.

One way to accomplish this objective is to initially replace the "factory installed" pressure regulator spring 37 (FIG. 1) with a stronger regulator spring 37 (FIG. 2) to enable the pressure regulator valve 36 to achieve a maximum line pressure greater than that permitted by the factory installed regulator spring. Then a "factory installed" separator plate having an orifice designated by reference numeral 40 (FIGS. 1 and 3) is replaced with a new separator plate having a smaller orifice designated by reference numeral 41 (FIGS. 2 and 4).The smaller orifice 41 is incorporated into the feed circuit that feeds line pressure to the VPS 46 as illustrated by FIG. 2. The smaller orifice 41 feeds line pressure into a channel casting designated by numeral 42 as shown in FIG. 5. Reference numeral 43 in the casting illustrated by FIG. 5 is the exit passage to the casing where the VPS 46 is located.

Figure 4:
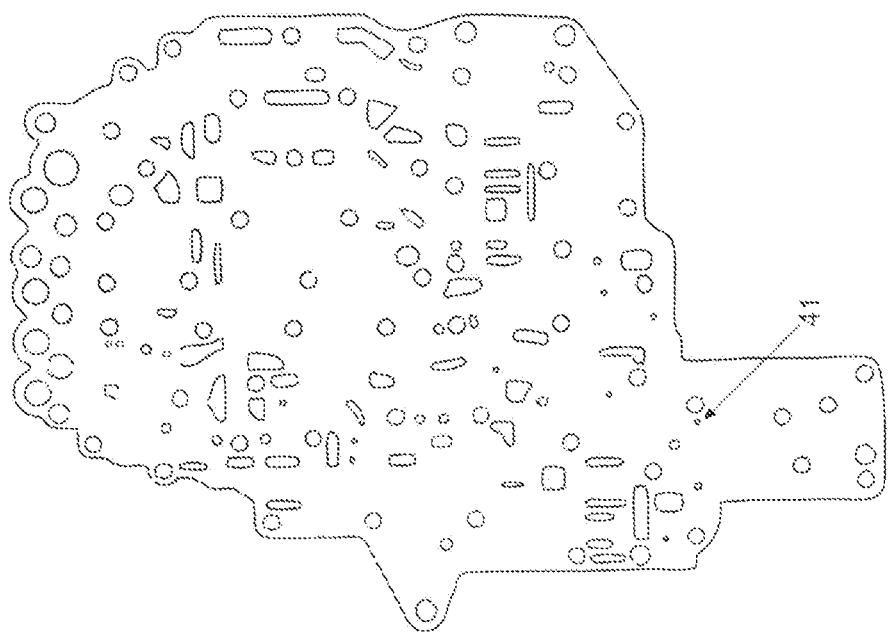
FIG. 4 illustrates a modification to the separator plate illustrated by FIG. 3 in accordance with the present invention.
Figure 5:
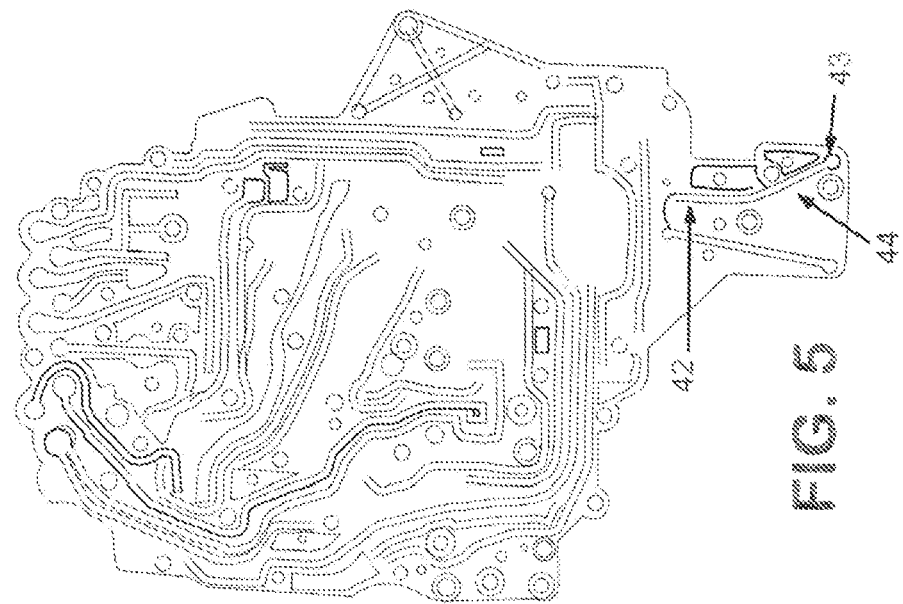
FIG. 5 illustrates the top side of a new casting for use in connection with the modified separator plate illustrated by FIG. 4.

In the alternative, the channel casting illustrated by FIG. 5 can include and directly incorporate therein the new smaller orifice 41 at the upstream end of the passage 44, which will avoid the step of replacing the "factory installed" separator plate having the larger orifice 40 (FIG. 3) with the new separator plate having the smaller orifice 41 (FIG. 4).

Figure 6:
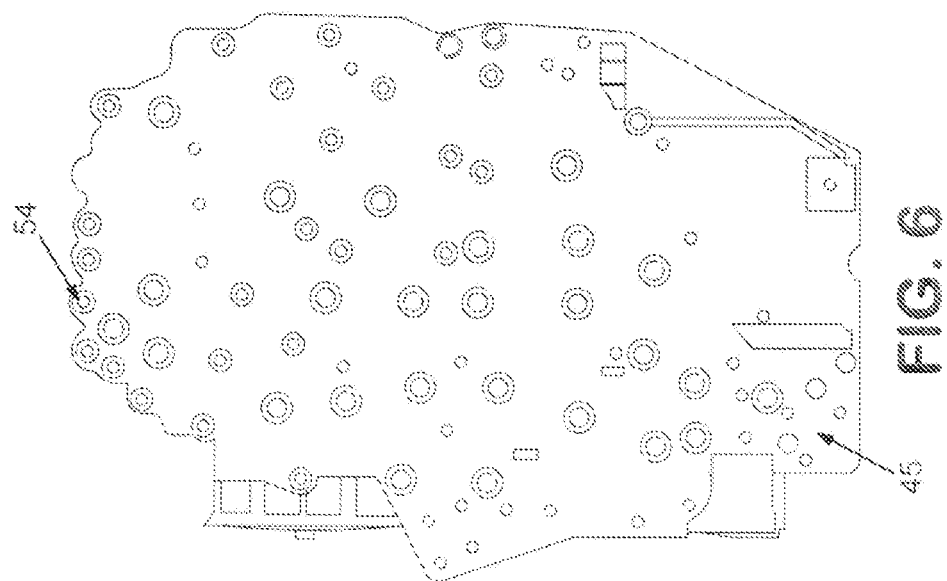
FIG. 6 illustrates the bottom side of the casting illustrated by FIG. 5.

After the smaller feed orifice 41 is provided upstream from the VPS 46 as illustrated by FIG. 2, a bleed orifice (i.e., a controlled leak) designated by reference numeral 47 is provided in the hydraulic circuit between the smaller feed orifice 41 and the VPS 46. This bleed orifice is threaded into an existing threaded and plugged hole 45 in the channel casting illustrated by FIG. 6. Reference numeral 44 of FIG. 6 illustrates the bottom side of the channel casting where the plugged hole 45 hole connects to the VPS 46.

The size of the bleed opening 47 is selected to correspond to the increased strength of the replacement regulator spring 37. The discharge of fluid flowing through the reduced size orifice 41 from the hydraulic circuit through the bleed opening 47 before it reaches the VPS 46 causes the VPS 46 to sense only reduced line pressure and not the increased line pressure resulting from the stronger replacement regulator spring. Accordingly, the VPS 46 and the onboard computer will not take any corrective action to lower the increased overall line pressure since the VPS 46 will only sense a line pressure lower than the increased maximum line pressure. In this manner, the hydraulic circuit can achieve a maximum line pressure greater than that permitted by the "factory installed" transmission, while avoiding the automatic decrease in the maximum line pressure which would otherwise occur in the "factory installed" transmission.

Although FIG. 2 of the drawing shows that the bleed opening 47 is provided by drilling the opening in a preexisting threaded plug, the bleed opening can be provided in other ways, such as punching or drilling a new opening or slot in a portion of a feed line of the hydraulic circuitry between the reduced size orifice 41 and the VPS 46, provided that the bleed opening 47 is located upstream from the VPS 46 and downstream from the reduced size orifice 41.

Controlling the size of the reduced orifice 41 and the size of the bleed opening 47 enables the factory installed regulator spring to be replaced by a new and stronger regulator spring to permit the transmission to perform high performance and heavy duty operations. The decrease in pressure sensed by the VPS 46 resulting from the reduced size orifice 41 and the bleed opening 47, corresponds to the increased overall maximum line pressure achievable by the hydraulic circuit so that the increased strength of the new regulator spring corresponds to the overall increase in the maximum line pressure. The modification to the "factory installed" automotive transmission as described above is applicable to the operation of the transmission in both forward and reverse gear ranges.

Figure 7:
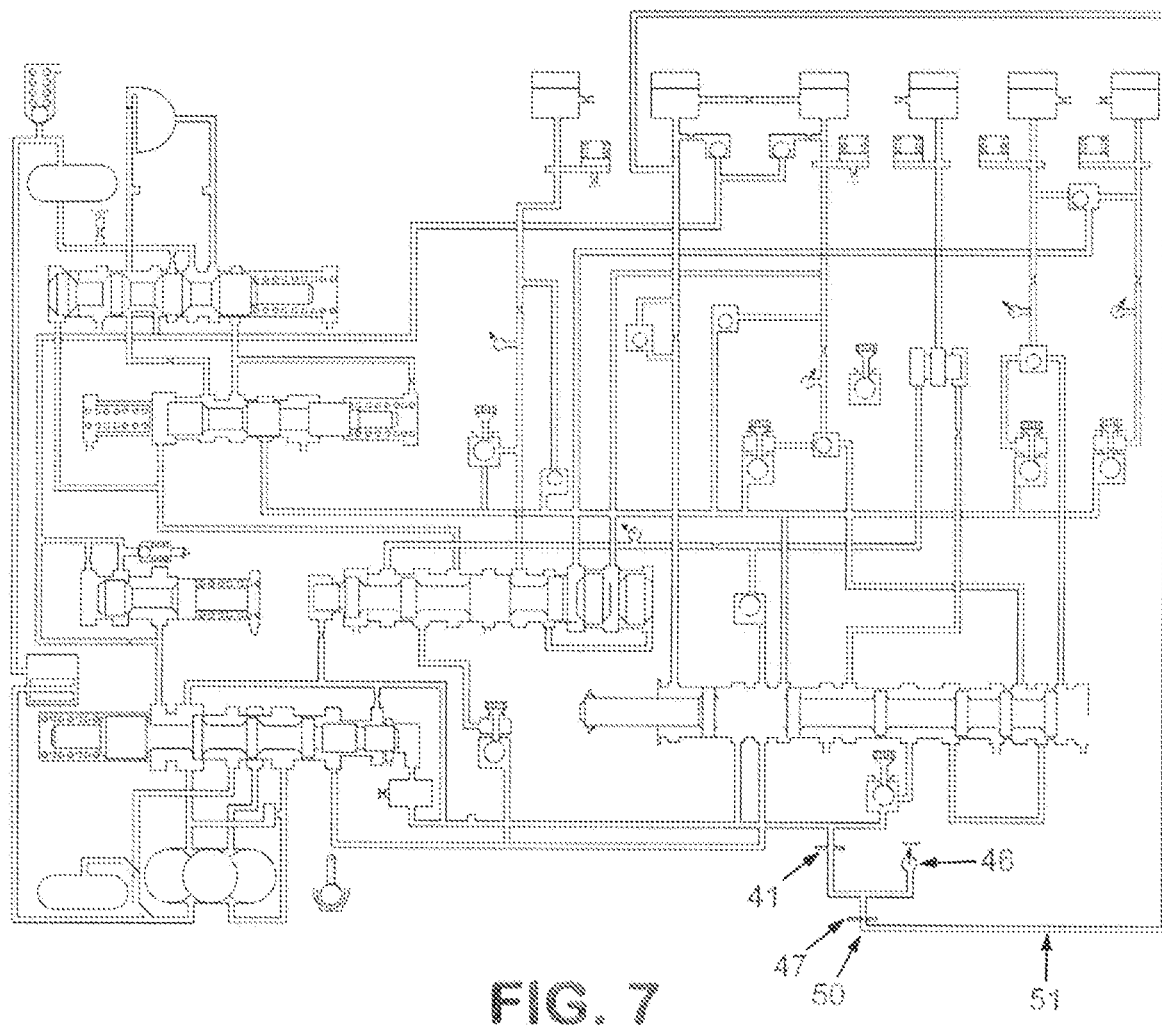
FIG. 7 illustrates a further modification to the hydraulic circuit of the "factory installed" 45RFE automotive transmission in accordance with the present invention.

FIG. 7 illustrates a further modification to the hydraulic circuitry illustrated by FIG. 2. In the modification illustrated by FIG. 7, an external tube 51 is provided to connect the exhaust end of the bleed opening 47 at the location shown by reference numeral 50, to the reverse pressure port 52 so that the bleed opening 47 can exhaust pressure only when the gear shifter is in the forward range. (Reference numeral 54 shown in FIG. 6 shows the physical location of the reverse pressure port on the bottom of the channel casting). When the gear shifter is in the reverse range, line pressure will be fed from both ends of the tube 51, thereby preventing discharge of fluid from the bleed opening 47 so that the VPS 46 will not sense any reduced line pressure. Accordingly, increased maximum line pressure can only be attained in the forward gear range, while the maximum line pressure of the "factory installed" automotive transmission will be maintained in the reverse gear range.

Figure 8:
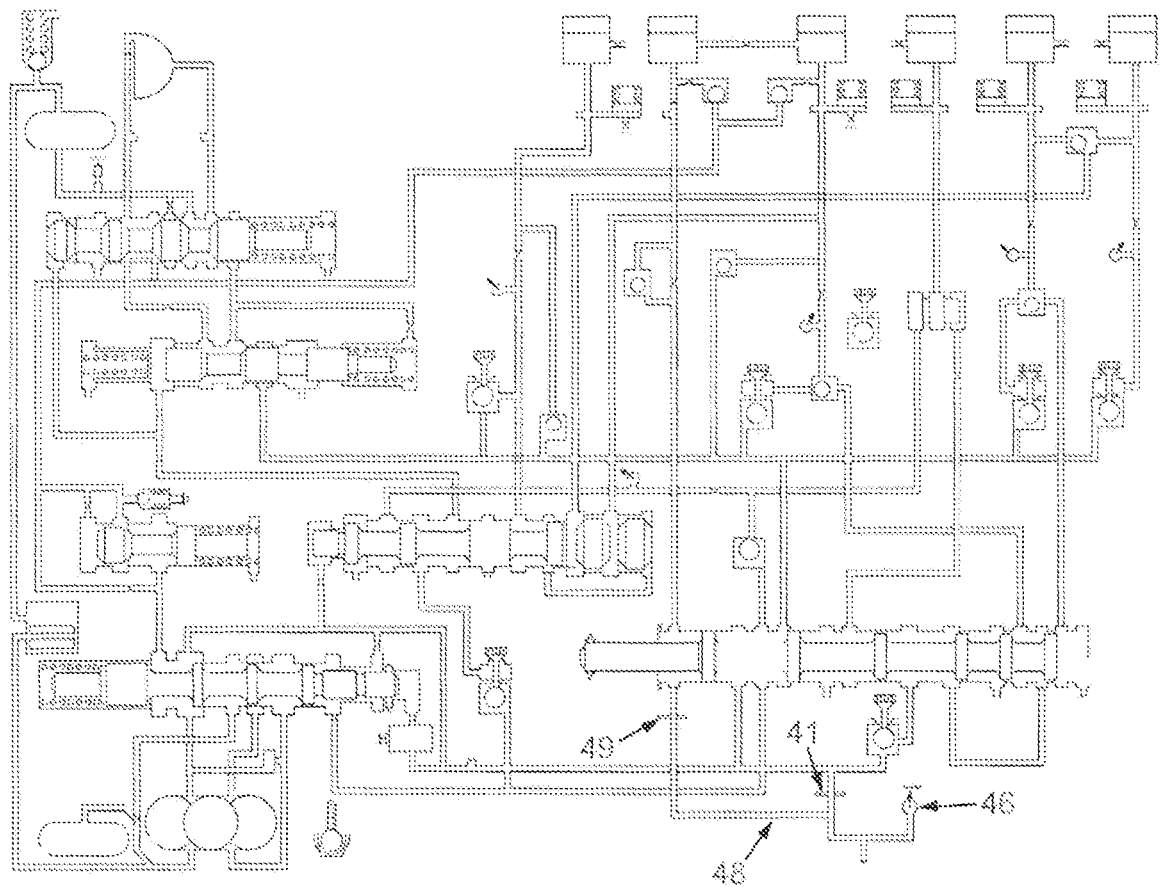
FIG. 8 illustrates a further modification to the hydraulic circuit of the "factory installed" 45RFE automotive transmission in accordance with the present invention.
Figure 10:
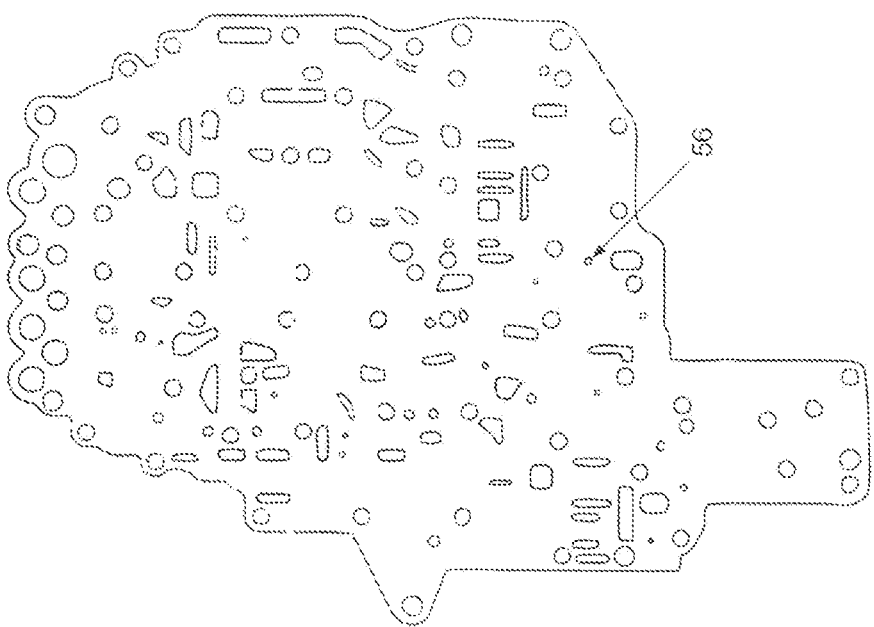
FIGS. 9 and 10 illustrate two new separator plates for use in connection with the modified hydraulic circuitry illustrated by FIG. 8.
Figure 9:
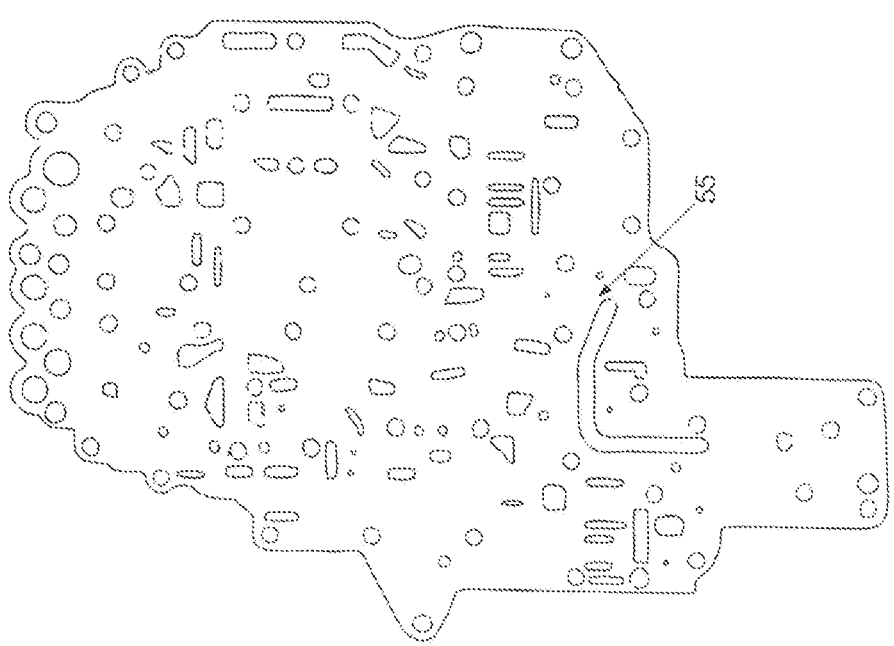

FIG. 8 illustrates a modification to the hydraulic circuitry illustrated by FIG. 7. Instead of providing an external tube 51 as is done in FIG. 7, the FIG. 8 hydraulic circuitry provides an internal passageway designated by reference numeral 48 which reroutes a portion of the fluid flow to the VPS 46 to a newly new opening designated by reference numeral 49 provided in the reverse circuit. This is accomplished by stacking three separator plates together and using a slot 55 (FIG. 9) in the middle plate to transfer the exhaust fluid flow to the new opening 56 (FIG. 10) provided in the reverse circuit. When the gear shifter is in the reverse range, line pressure from both ends of the slot will prevent fluid discharge through the bleed opening 47 so that the VPS 46 will not sense any reduced line pressure. Accordingly, increased maximum line pressure can only be attained in the forward gear range, while the maximum line pressure of the "factory installed" automotive transmission will be maintained in the reverse gear range. The new circuit provided by FIG. 8 can also be accomplished by incorporating the new circuit directly into a new replacement casting channel such as that illustrated by FIG. 5 instead of making separate modifications to the "factory installed" hydraulic circuit.

In summary, the modification to the hydraulic circuitry of the "factory installed" automotive transmission illustrated by FIG. 2 permits the maximum line pressure to be increased in both the forward and reverse gear ranges, while the modification to the hydraulic circuitry of the "factory installed" automotive transmissions illustrated by FIGS. 7 and 8 permit the maximum line pressure to be increased in only the forward gear ranges but not in the reverse gear range which is maintained at the "factory installed" maximum line pressure.

FIG. 11 illustrates a portion of the hydraulic circuitry of the "factory installed" 45RFE automotive transmission and a modification to the Torque Converter Clutch regulator valve in accordance with the present invention. To compensate for the increased Horsepower/Torque on modified engines resulting from the increase in maximum line pressure produced by the modifications to the factory installed hydraulic circuit as previously discussed herein, the hydraulic circuitry must be further modified to prevent damage to the clutch. The further modification to the hydraulic circuitry, as illustrated by FIG. 11, allows the main pressure to be increased without over-pressuring the Torque Converter Clutch regulator valve during TCC (Torque Converter Clutch) apply. This modification reduces rough lockup apply and prevents catastrophic converter failure (ballooning) as well as overloading of the engine crankshaft main thrust bearing due to excessive Torque Converter Clutch apply pressure. Orificed TCC signal pressure is now limited to prevent TCC regulator from reaching main system pressure values and thereby protecting the system.

More specifically, FIG. 11 illustrates the modified Torque Converter Clutch regulator valve generally designated by reference numeral 2 which now includes a ball 4 held in a ball seat 6 by a spring 8. The ball 4 seals the entrance to a discharge line 12. The main line pressure, including the increase to the maximum main line pressure in accordance with the present invention, is applied to the modified valve 2 through input line 10. When the applied pressure attains a value greater than the force applied by spring 8 on the ball 4, the ball unseats and unseals the discharge line 12, thereby exhausting excess fluid pressure and preventing the increased maximum line pressure from being applied to the converter. The spring 8 is selected such that it releases the ball 4 at a predetermined line pressure below a line pressure which will result in damage to the clutch.

FIG. 11(*a*) is an alternative modification to the hydraulic circuitry of FIG. 11 for preventing damage to the clutch from over-pressuring as a result of the increased maximum main line pressure in accordance with the present invention. The Torque Converter Clutch regulator valve 2 is modified to include a new exhaust port 14 for venting excess line pressure applied to the valve 2 through input line 10. The spring of the "factory installed" Torque Converter Clutch regulator valve is replaced by a new spring 16. The new spring 16 is calibrated to cooperate with the new exhaust port 14 to exhaust excess pressure when the line pressure applied through the input line 10 exceeds a predetermined value which would cause damage to the clutch. The position of the exhaust port 14 and the characteristic of the spring 16 are selected such that as the applied line pressure from the line 10 moves the valve 2 in a leftward direction as shown in FIG. 11(*a*), the discharge port 14 is opened to discharge excess line pressure through the discharge port when the predetermined line pressure value is reached.

FIG. 12 illustrates a further modification to the hydraulic circuitry of the "factory installed" 45/RFE automotive transmission. To compensate for the increased Horsepower/Torque on modified engines resulting from the increase in maximum line pressure produced by the modifications to the factory installed hydraulic circuit as previously discussed herein, the hydraulic circuitry must be further modified to prevent torque converter clutch slippage and torque converter clutch slip error codes especially at full throttle. However, a common side effect of a triple clutch torque converter is a rough to almost abrupt lockup apply, especially at lighter throttle openings. The hydraulic circuitry has been modified to provide a new TCC control valve that restricts the flow of release oil from the converter circuit to effectively slow the apply down to a more comfortable level. This is accomplished without reducing the holding capacity of the torque converter clutch at full throttle and advantageously maintains holding capacity while providing smooth converter apply.

More specifically as illustrated by FIG. 12, the "factory installed" Torque Converter Clutch control valve switch is modified to that designated by reference numeral 18. The spool of the "factory installed" valve switch is replaced by a larger diameter spool 20. The larger spool restricts the flow of fluid to the exhaust 22 resulting in a smoother apply of pressure to the clutch converter particularly in automotive engines having a triple clutch. The increased size of the replacement spool 20 is selected to provide the desired restriction in fluid flow to the exhaust 22.

The description of the preferred embodiments of the invention discussed and illustrated herein are intended to be exemplary only and not restrictive of the scope of the invention, that scope being defined by the following claims and all equivalents thereto.

The invention claimed is:

1. In an hydraulic circuit for an automotive transmission including a pressure regulator valve and a pressure regulator spring for establishing a predetermined maximum line pressure in said hydraulic circuit, said pressure regulator valve being in fluid communication with an onboard computer via a portion of said hydraulic circuitry for monitoring line pressure and preventing maximum line pressure from exceeding said predetermined maximum line pressure, the improvement comprising:

replacing said pressure regulator spring with a replacement pressure regulator spring to increase the maximum line pressure above said predetermined maximum line pressure, and modifying the portion of said hydraulic circuitry in fluid communication with said onboard computer such that said onboard computer does not sense line pressure in excess of said predetermined maximum line pressure.

2. The hydraulic circuitry as claimed in claim 1 comprising an opening in said portion of said hydraulic circuit in fluid communication with said onboard computer for discharging a portion of fluid flowing towards said onboard computer for reducing the pressure sensed by the onboard computer.

3. The hydraulic circuitry as claimed in claim 1 comprising a reduced cross sectional area in part of said portion of said hydraulic circuit in fluid communication with said onboard computer for reducing the pressure sensed by the onboard computer.

4. The hydraulic circuitry as claimed in claim 1 comprising an opening in said portion of said hydraulic circuit in fluid communication with said onboard computer for discharging a portion of fluid flowing towards said onboard computer for reducing the pressure sensed by the onboard computer, and a reduced cross sectional area in part of said portion of said hydraulic circuit in fluid communication with said onboard computer for reducing the pressure sensed by the onboard computer.

5. The hydraulic circuitry as claimed in claim 4, wherein said opening in said portion of said hydraulic circuit in fluid communication with said onboard computer is disposed between said reduced cross sectional area in part of said portion of said hydraulic circuit and said onboard computer.

6. The hydraulic circuitry as claimed in claim 1 wherein said portion of said hydraulic circuitry in fluid communication with said onboard computer comprises a variable pressure sensor.

7. A method of modifying an automotive transmission having a pressure regulator valve and a pressure regulator spring for establishing a predetermined maximum line pressure in said hydraulic circuit, said pressure regulator valve being in fluid communication with an onboard computer via a portion of said hydraulic circuitry for monitoring line pressure and preventing maximum line pressure from exceeding said predetermined maximum line pressure, the steps of said method including:
replacing said pressure regulator spring with a replacement presssure regulator spring to increase maximum line pressure above said predetermined maximum line pressure; and
modifying the portion of said hydraulic circuitry in fluid communication with said onboard computer to prevent said onboard computer from sensing line pressure exceeding said predetermined maximum line pressure.

8. The method as clamed in claim 7 wherein the step of modifying said portion of said hydraulic circuitry includes the step of providing an opening in said portion of said hydraulic circuitry for discharging a portion of fluid flowing through said portion of hydraulic circuitry for reducing the pressure sensed by said onboard computer.

9. The method as claimed in claim 7 wherein the step of modifying said portion of said hydraulic circuitry includes the step of reducing the cross sectional area in part of said portion of said hydraulic circuit in fluid communication with said onboard computer for reducing the pressure sensed by the onboard computer.

10. The method as claimed in claim 7 wherein the step of modifying said portion of said hydraulic circuitry includes the steps of providing an opening in said portion of said hydraulic circuitry for discharging a portion of fluid flowing through said portion of hydraulic circuitry for reducing the pressure sensed by said onboard computer, and reducing the cross sectional area in part of said portion of said hydraulic circuit in fluid communication with said onboard computer for reducing the pressure sensed by the onboard computer.

11. The method as claimed in claim 10 wherein the step of modifying said portion of said hydraulic circuitry includes the step of positioning said opening in said portion of said hydraulic circuit between said reduced cross sectional area and said onboard computer.

12. The method as claimed in claim 7 including the step of providing said portion of said hydraulic circuitry in fluid communication with said onboard computer with a variable pressure sensor in communication with said onboard computer.

13. The method as claimed in claim 7 wherein the step of modifying said portion of said hydraulic circuitry in fluid communication with said onboard computer to prevent said onboard computer from sensing line pressure exceeding said predetermined maximum line pressure includes the step of preventing said onboard computer from sensing line pressure exceeding said predetermined maximum line pressure only in the forward gear ranges of the automotive transmission.

14. The method as claimed in claim 13 including the step of providing a connection between an exhaust opening in said portion of said hydraulic circuitry in fluid communication with said onboard computer to a reverse pressure port such that fluid is exhausted from said exhaust opening only in the forward ranges of said automotive transmission.

15. The method as claimed in claim 14 including the step of providing said connection between said exhaust opening and said reverse pressure port by an external tube.

16. The method as claimed in claim 13 including the step of providing an internal passageway for rerouting part of the fluid flow within said portion of said hydraulic circuitry to an exhaust opening provided in a reverse circuit such that fluid is exhausted from said exhaust opening in said reverse circuit only in the forward ranges of said automotive transmission.

17. A method of modifying an automotive transmission having a pressure regulator valve and a pressure regulator spring for establishing a predetermined maximum fine pressure in said hydraulic circuit, said pressure regulator valve being in fluid communication with an onboard computer via a portion of said hydraulic circuitry for monitoring line pressure and preventing maximum line pressure from exceeding said predetermined maximum line pressure, the steps of said method including:
replacing said pressure regulator spring with a replacement pressure regulator spring to increase maximum line pressure above said predetermined maximum line pressure;
modifying the portion of said hydraulic circuitry in fluid communication with said onboard computer to prevent said onboard computer from sensing line pressure exceeding said predetermined maximum fine pressure,
modifying the pressure regulator valve to include a ball, a ball seat, and a spring biasing the ball on the ball seat within a bore of the pressure regulator valve to prevent fluid from exhausting from an exhaust port in the bore of the pressure regulator valve, and
releasing the ball from the ball seat to permit fluid to exhaust from said exhaust port when line pressure exceeding said predetermined maximum line pressure is applied to the pressure regulator valve.

18. A method of modifying an automotive transmission having a pressure regulator valve and a pressure regulator spring for establishing a predetermined maximum line pressure in said hydraulic circuit, said pressure regulator valve being in fluid communication with an onboard computer via a portion of said hydraulic circuitry for monitoring line pressure and preventing maximum line pressure from exceeding said predetermined maximum line pressure, the steps of said method including:

replacing said pressure regulator spring with a replacement pressure regulator spring to increase maximum line pressure above said predetermined maximum line pressure;

modifying the portion of said hydraulic circuitry in fluid communication with said onboard computer to prevent said onboard computer from sensing line pressure exceeding said predetermined maximum line pressure, providing an exhaust opening in a bore of said pressure regulator valve arranged to cooperate with said replacement pressure regulator spring such that when line pressure greater than the predetermined maximum line pressure is applied to the pressure regulator valve, fluid is exhausted from said exhaust opening.

19. The method as claimed in claim 18 wherein said hydraulic circuit includes a control valve in fluid communication with said pressure regulator valve for controlling the pressure applied to a torque converter clutch, the steps of said method including replacing a spool in the control valve with a larger spool for restricting the flow of fluid from an exhaust port in said control valve for reducing the rate at which pressure is applied to the torque converter clutch.

20. The method as claimed in claim 19 wherein said hydraulic circuit includes a control valve in fluid communication with said pressure regulator valve for controlling the pressure applied to a torque converter clutch, the steps of said method including replacing a spool in the control valve with a larger spool for restricting the flow of fluid from an exhaust port in said control valve for reducing the rate at which pressure is applied to the torque converter clutch.

* * * * *

UNITED STATES PATENT AND TRADEMARK OFFICE
CERTIFICATE OF CORRECTION

PATENT NO. : 11,105,415 B2  
APPLICATION NO. : 16/429211  
DATED : August 31, 2021  
INVENTOR(S) : David A. Hardin Page 1 of 1

It is certified that error appears in the above-identified patent and that said Letters Patent is hereby corrected as shown below:

In the Claims

Claim 17, Lines 3 and 17 (Column 8, Line 35 and Column 8, Line 49): Delete "fine", and substitute --line--.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*